(12) United States Patent
Mangalore et al.

(10) Patent No.: US 8,176,534 B2
(45) Date of Patent: May 8, 2012

(54) METHOD AND APPARATUS FOR PROVISIONING A DEVICE TO ACCESS DIGITAL RIGHTS MANAGEMENT (DRM) SERVICES IN A UNIVERSAL PLUG AND PLAY (UPNP) NETWORK

(75) Inventors: Geetha Mangalore, San Diego, CA (US); Petr Peterka, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 1370 days.

(21) Appl. No.: 11/323,517

(22) Filed: Dec. 30, 2005

(65) Prior Publication Data

US 2007/0157295 A1 Jul. 5, 2007

(51) Int. Cl.
*G06F 7/04* (2006.01)

(52) U.S. Cl. ........... 726/6; 713/155; 713/156; 713/159; 713/161; 713/170; 713/173; 713/176; 709/248; 370/401; 710/63; 726/2; 726/10; 726/26

(58) Field of Classification Search ................... 726/2, 6, 726/10, 26; 713/155–159, 168–181; 709/248; 370/401; 710/63

See application file for complete search history.

(56) References Cited

U.S. PATENT DOCUMENTS

| | | | |
|---|---|---|---|
| 7,382,879 B1* | 6/2008 | Miller ........................... | 380/201 |
| 2002/0078243 A1* | 6/2002 | Rich et al. ..................... | 709/248 |
| 2003/0233553 A1* | 12/2003 | Parks et al. .................... | 713/178 |
| 2005/0074018 A1* | 4/2005 | Zintel et al. ................... | 370/401 |
| 2005/0120246 A1 | 6/2005 | Jang et al. | |
| 2005/0198693 A1* | 9/2005 | Choi et al. ...................... | 726/26 |
| 2007/0143489 A1* | 6/2007 | Pantalone ...................... | 709/230 |
| 2007/0168051 A1* | 7/2007 | Bronnenberg et al. ......... | 700/20 |
| 2008/0060081 A1* | 3/2008 | Van Den Heuvel ............. | 726/27 |

FOREIGN PATENT DOCUMENTS

| | | |
|---|---|---|
| WO | 2004040929 | 5/2004 |
| WO | WO 2005/017654 A2 | 2/2005 |
| WO | WO2005017654 A2 * | 2/2005 |

OTHER PUBLICATIONS

Sakane et al., "Applying Kerberos to the Communication Environment for Information Appliances", Proceedings of the 2003 Symposium on Applications and the Internet Workshops (SAINT'03 Workshops), 2003.*

Ganesan et al., "Yaksha: Augmenting Kerberos with Public Key Cryptography", Network and Distributed System Security, pp. 132-143, IEEE. 1995.*

Office Action, Canadian App. No. 2,572,532, Jul. 20, 2010.
Office Action, Re: Canadian App. No. 2,572,532 Mar. 25, 2009.

(Continued)

*Primary Examiner* — Vivek Srivastava
*Assistant Examiner* — Hee Song
(74) *Attorney, Agent, or Firm* — Stewart M. Wiener

(57) ABSTRACT

A method and apparatus are provided for enabling a Universal Plug and Play (UPnP) device to be automatically provisioned to access services without the need for manual interaction. In accordance with the invention, when a UPnP device needs to be provisioned, it automatically obtains pre-provisioning information from a provisioning device on the home network, and uses the pre-provisioning information to interact with the provisioning device to cause the UPnP device to be provisioned. The provisioning enables the UPnP device to access services, including digital rights management (DRM) services, over a network.

31 Claims, 4 Drawing Sheets

OTHER PUBLICATIONS

EPC Extended Search Report, Re: Application #06026713.5-1244 /1804459 Jun. 17, 2009.
John Ritchie, et al., "UPnP Av Architecture:0.83", Contributing Members of the UPnP Forum, Jun. 12, 2002.
Alan Presser, et al., "AVTransport:2 Service Template Version 1.01", Contributing Members of the UPnP Forum, May 31, 2006.
John Ritchie, "MediaServer:1 Device Template Version 1.01", Contributing Members of the UPnP Forum, Jun. 25, 2002.
Shannon Chan, et al., "ConnectionManager:1 Service Template Version 1.01", Contributing Members of the UPnP Forum, Jun. 25, 2002.
Kirt Debique, et al., "ContentDirectory:1 Service Template Version 1.01", Contributing Members of the UPnP Forum, Jun. 25, 2002.
Larry Buerk, et al., "AVTransport:1 Service Template Version 1.01", Contributing Members of the UPnP Forum, Jun. 25, 2002.
Open Services Gateway Initiative, "OSGI Service Platform: Release 3," Mar. 2003, pp. 503-528.
Office Action Re: Canadian Application No. 2,572,532, dated Jun. 10, 2011.
Contributing Members of the UPnP Forum; Ritchie, John et al, UPnP Av Architecture:0.83, Jun. 12, 2002.
Contributing Members of the UPnP Forum; Presser, Alan et al, "AVTransport:2 Service Template Version 1.01", May 31, 2006.
Contributing Members of the UPnP Forum; Ritchie, John. "MediaServier:1 Device Template Version 1.01", Jun. 25, 2002.
Contributing Members of the UPnP Forum; Chan, Shannon et al, "ConnectionManager:1 Service Template Version 1.01", Jun. 25, 2002.
Contributing Members of the UPnP Forum; Debique, Kid et al, "ContentDirectory:1 Service Template Version 1.01", Jun. 25, 2002.
Contributing Members of the UPnP Forum; Buerk, Larry et al, "AVTransport:1 Service Template Version 1.01", Jun. 25, 2002.
"OSGI Service Platform Release 3: UPnP Device Service Specification", by Open Services Gateway Initiative. Mar. 2003, pp. 503-528.

* cited by examiner

METHOD AND APPARATUS FOR PROVISIONING A DEVICE TO ACCESS DIGITAL RIGHTS MANAGEMENT (DRM) SERVICES IN A UNIVERSAL PLUG AND PLAY (UPNP) NETWORK

TECHNICAL FIELD OF THE INVENTION

The invention relates to provisioning devices in a Universal Plug and Play (UPnP) network. More particularly, the invention relates to enabling a UPnP device to automatically discover Digital Rights Management (DRM) services and provision itself to get access to such DRM services in a UPnP network such that no manual provisioning is required.

BACKGROUND OF THE INVENTION

The UPnP architecture is designed to provide peer-to-peer connectivity for various types of devices, including audio/video (A/V) devices, such as, for example, televisions (TVs), video cassette recorders (VCRs), compact disk (CD) players and recorders, digital video disk (DVD) players and recorders, personal video recorders (PVRs), cameras, set top boxes, etc.

The UpnP architecture specifies how devices are to join a network and how devices can be controlled using extensible markup language (XML) messages sent over hypertext transfer protocol (HTTP). UPnP specifications leverage from existing standard protocols, such as HTTP, User Datagram Protocol (UDP), XML and Simple Object Access Protocol (SOAP). UPnP allows plug and play of networked devices.

Devices, services and control points are basic components of the UPnP device architecture. A UPnP device is any entity on the network that implements the protocols required by UPnP standard. A UPnP device supports zero or more services. A UPnP service is a unit of functionality implemented by a UPnP device. A UPnP service is a set of methods or actions, each of which has optional input and output parameters. A UPnP device also maintains state variables and sends notifications to control points when occurrences cause the state variables to change.

A control point is an entity in the network that works with or uses the functionality provided by a UPnP device. A control point can invoke actions on services. In client/server terminology, a control point is analogous to the client and a device is analogous to the server. The control point can also subscribe to events that cause the control point to be notified by the device when the device detects changes in its state variables.

Device discovery is provided in UPnP networks to enable control points to locate UPnP devices on the network and to determine the capabilities of the UPnP devices. When a UPnP device joins a network, the device acquires a unique address that the control point and other devices can use to address the device. Typically, either Dynamic Host Configuration Protocol (DHCP) or Automatic Private Internet Protocol (Auto IP) is used to assign an Internet Protocol (IP) address to the device joining the network. When the device joins the network, an XML device description document that summarizes the services and capabilities of the device in a standard format is communicated to the control point. The device joining the network uses a Simple Service Discovery Protocol (SSDP) message to advertise its services and capabilities to control points. Similarly, when a control point joins a network, it uses SSDP messages to locate devices of interest of the network. In either case, the result is that the XML device description document is communicated from the UPnP device to the control point.

Control is provided in the UPnP network by the control point, which sends requests in the form of SOAP control messages to UPnP devices requesting that actions be performed by the devices. The XML device description document defines the actions that services of the device are capable of performing or providing.

Eventing is provided in the UPnP network by the services of the UPnP devices notifying the control points when internal state variables of the UPnP devices change. The General Eventing and Notification Architecture (GENA) format is normally used for this purpose, and the notifications are normally in XML format. The device services publish updates when the state variables change, and control points may subscribe to receive the updates.

Presentation is provided in the UPnP network to allow users to control UPnP devices and/or view device status. If a UPnP device has a Uniform Resource Locator (URL) for presentation, a control point can retrieve a page from the URL, load the page into a browser software program, and allow a user to control the device or view the status of the device via an HTML-based user interface.

While discovery enables UPnP devices to locate other UPnP devices and determine each other's capabilities, discovery does not enable sufficient information to be obtained to enable provisioning to be performed without user interaction. Currently, provisioning requires that certain steps be manually performed by a user. For example, in the case in which a set top box of a home network is to be provisioned, the user normally obtains pre-provisioning information from a provider via telephone or the Internet, and then inputs the pre-provisioning information to the set top box. Once the set top box has been provided with the pre-provisioning information, it interacts with a gateway server of the home network to become provisioned.

Requiring user interaction imposes a burden on the user, and makes the provisioning process prone to human error. One of the primary goals of the UPnP architecture is to reduce the amount of user interaction that is required in order to join a device to a network and enable the device to communicate with other devices already on the network. The current process of provisioning a device is not wholly consistent with this goal because of the level of user interaction that is currently needed to provision a device. A need exists for a way to provision devices on a UPnP network that does not require steps to be manually performed by a user including the discovery of a DRM service and obtaining relevant DRM pre-provisioning data.

SUMMARY OF THE INVENTION

The invention provides a method and an apparatus for provisioning a Universal Plug and Play (UPnP) device to access digital rights management (DRM) services without the need for human interaction. The UPnP device to be provisioned comprises a processor that is configured to obtain pre-provisioning information from a provisioning device and to use the pre-provisioning information to interact with the provisioning device to cause the UPnP device to be provisioned. The UPnP device includes a memory device in which the pre-provisioning information is stored. The provisioning device comprises a processor that is configured to receive a request for pre-provisioning information from the UPnP device and to send pre-provisioning information to the UPnP device. The provisioning device includes a memory device that stores pre-provisioning information.

The method for provisioning a UPnP device performed by the UPnP device comprises sending a request from a UPnP device to a provisioning device for pre-provisioning information, receiving pre-provisioning information in the UPnP device sent by the provisioning device to the UPnP device, and using the received pre-provisioning information in the UPnP device to cause the UPnP device to be provisioned by the provisioning device.

The method for provisioning a UPnP device performed by the provisioning device comprises receiving a request for pre-provisioning information in a provisioning device, and sending pre-provisioning information to the UPnP device from the provisioning device.

The invention also comprises a computer program that is executed in a UPnP device for provisioning a UPnP device. The program comprises instructions for sending a request from a UPnP device to a provisioning device for pre-provisioning information, instructions for receiving pre-provisioning information in the UPnP device sent by the provisioning device to the UPnP device, and instructions for processing the received pre-provisioning information in the UPnP device to cause the UPnP device to be provisioned by the provisioning device.

The invention also comprises a computer program that is executed in a provisioning device for provisioning a UPnP device. The program comprises instructions for receiving a request for pre-provisioning information in a provisioning device, and instructions for sending pre-provisioning information to the UPnP device from the provisioning device.

These and other features and advantages of the invention will become apparent from the following description, drawings and claims.

DETAILED DESCRIPTION OF THE PREFERRED EMBODIMENT

In accordance with the invention, when a UPnP device needs to be provisioned, it automatically obtains provisioning information from a provisioning device on the network, and uses the provisioning information to cause it to be provisioned by the provisioning device. In accordance with the preferred embodiment, the UPnP device to be provisioned is an IP set-top box (IPSTB) and the provisioning device is an IP rights management (IPRM) server that functions as a home gateway for performing digital rights management (DRM) in the role of a key distribution center (KDC), referred to herein as Mini-KDC. The home gateway server may be, for example, a set-top box, a personal video recorder (PVR), a digital video recorder (DVR), a personal computer, a satellite received, a cable gateway, a digital subscriber line (DSL) gateway, or any other suitable device capable of performing the functions of a home gateway server. The UPnP device to be provisioned may be, for example, a set-top box, a personal computer (PC), a portable video player, a cell phone, a video player in an automobile, a PDA, a satellite receiver, or any other suitable device capable of functioning as a home gateway client.

The IPRM gateway server controls access to services and/or digital content stored on the gateway or another server already provisioned to the trusted home network to ensure that content is only provided to authorized devices that have been provisioned by the IPRM gateway server. Of course, the invention is not limited with respect to the types of UPnP devices that are provisioned or that perform provisioning.

Figure 1:
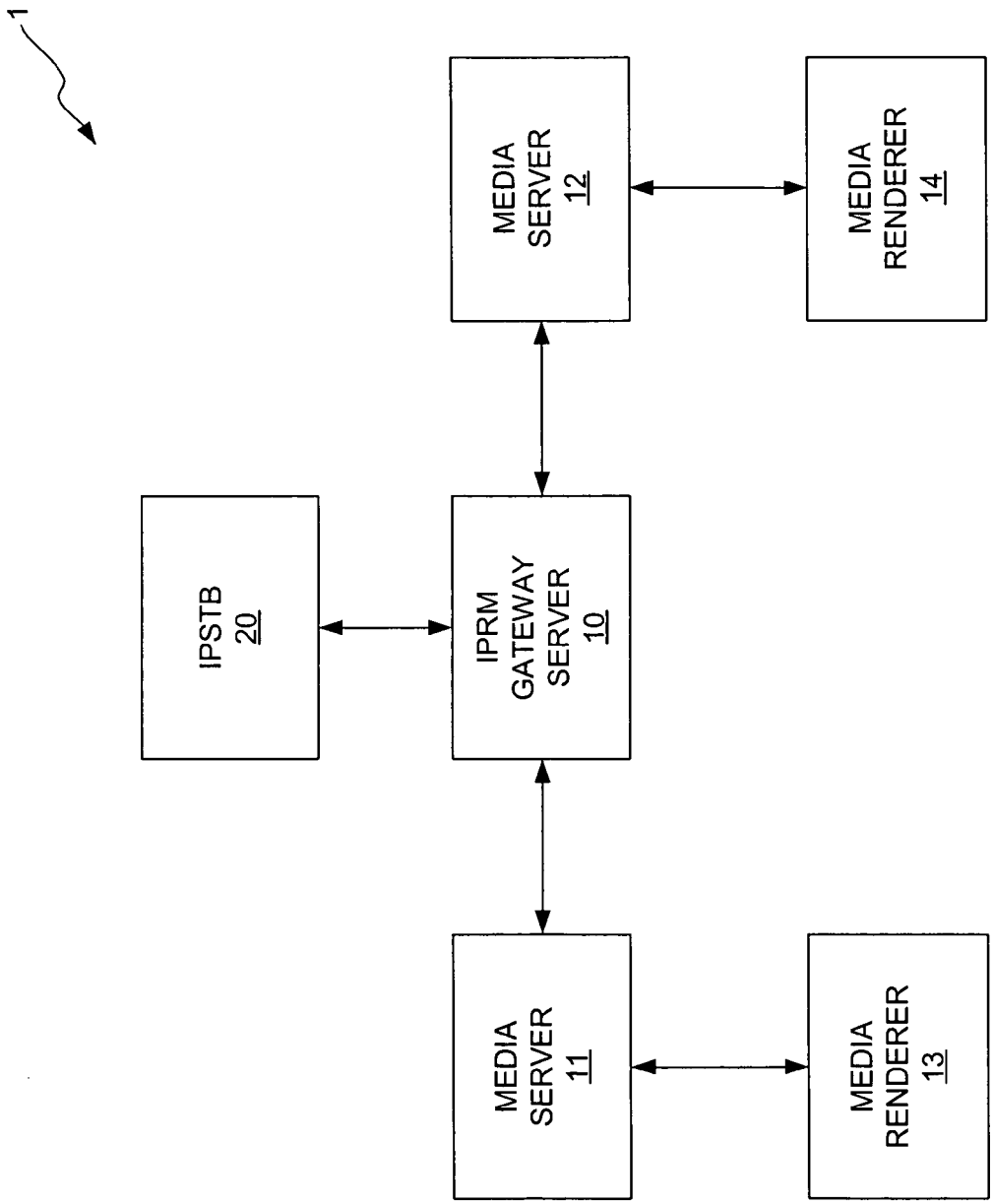
FIG. 1 illustrates a pictorial diagram of a home network in which the method and apparatus of the invention are employed.

FIG. 1 illustrates a pictorial diagram of a home network 1 in which the method and apparatus of the invention are employed. The home network 1 includes an IPRM gateway server 10 acting as a Mini-KDC, which may also be a media server, and an IPSTB 20 to be provisioned by the IPRM gateway server 10. The home network 1 also typically includes one or more media servers 11 and 12 and one or more media renderers 13 and 14. The IPRM gateway server 10, the IPSTB 20, the media servers 11 and 12, and the media renderers 13 and 14 are in communication with one another via the home network 1, which may be a wired or wireless network. Communications over the home network 1 preferably use the IP communications protocol. Therefore, every device on the network typically has an IP address.

The media servers 11 and 12 are devices that have previously been provisioned to the gateway server 10 and that store content, which may be accessed by the IPSTB 20 once the IPSTB 20 has been provisioned by the IPRM gateway server 10. For example, a media server may be a set-top box, a DVR, a PVR, a VCR, etc. The media renderers 13 and 14 are devices that render content, such as, for example, TVs, stereos, etc., that are attached to or are part of a client device, such as the IPSTB. It should be noted that servers may also act as clients and consume content, in which case they may have a renderer connected to them as well. It should also be noted that in the UPnP terminology, the servers are normally called Digital Media Servers (DMS) and the clients are normally called Digital Media Players (DMP) or Digital Media Renderers (DMR).

In the network 1, the IPSTB 20 functions as the UPnP control point. Once the IPSTB 20 has been provisioned by the IPRM gateway server 10, the IPSTB 20 may obtain content from the media servers 11 and 12 and cause the content to be rendered by the media renderers 13 and 14.

The provisioning process typically involves several steps. The client device first discovers other devices in the home network, determines which one acts as the DRM gateway, selects one of them if more than one is discovered, obtains all necessary pre-provisioning information from the gateway, and invokes the DRM agent to complete the provisioning. It should be noted that a gateway may support multiple DRM systems, and the pre-provisioning information may contain different sets of data depending on the particular DRM system. The following examples show the pre-provisioning information used by IPRM. In the case in which the DRM gateway supports multiple DRM systems, the client selects one of them from which to obtain the pre-provisioning information. The selection is based on the client's own capabilities and configuration. For example, assuming that the gateway supports DRM system 1 and DRM system 2, and the client supports only DRM system 2, the client will only request the pre-provisioning information for DRM system 2.

Figure 2:
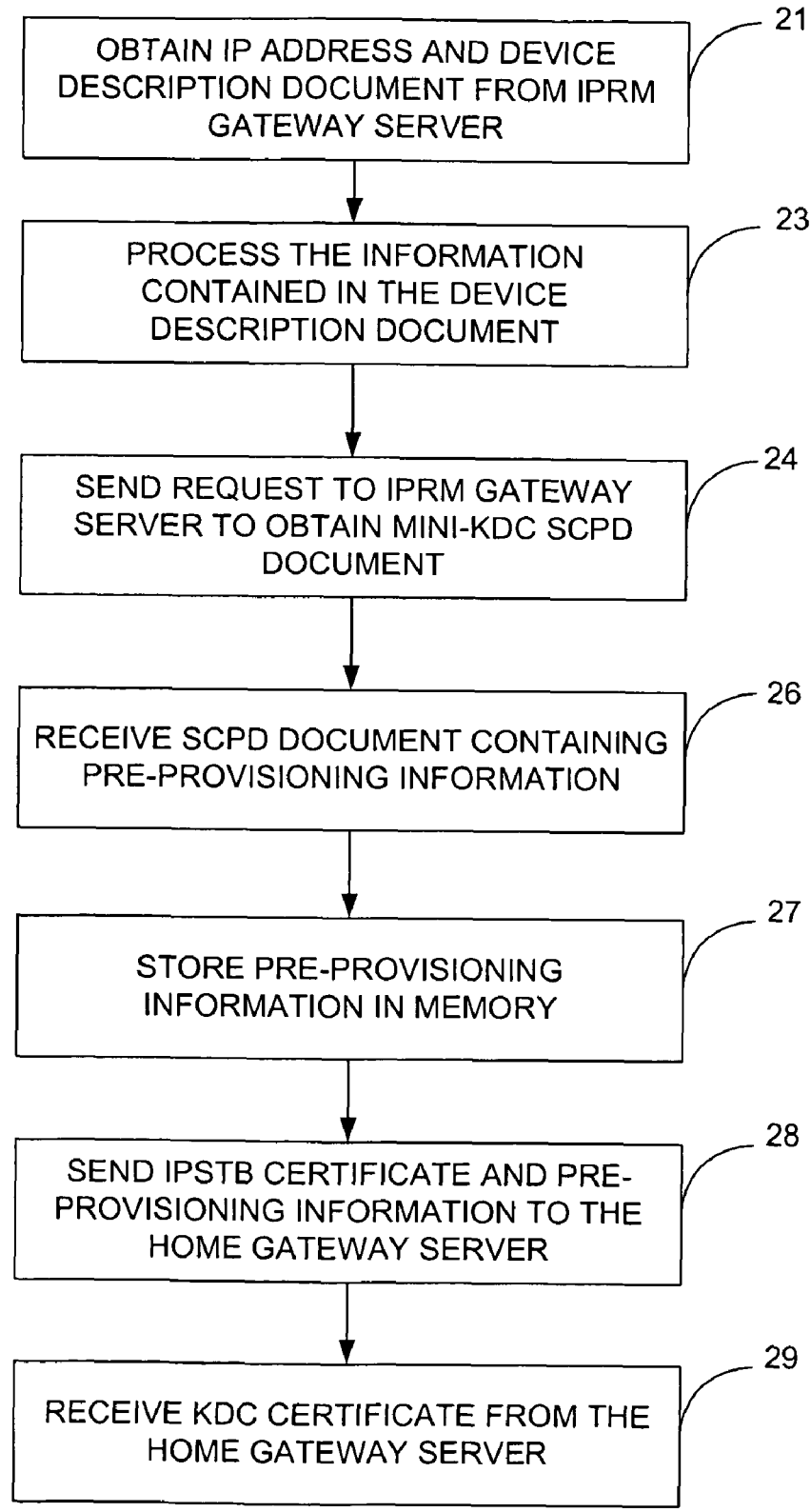
FIG. 2 illustrates a flowchart that represents tasks performed by the Internet Protocol Set-top Box (IPSTB) shown in FIG. 1 when being provisioned by an Internet Protocol Rights Management (IPRM) gateway server shown in FIG. 1 acting in a role of a Key Distribution Center (KDC).

The method of the invention in accordance with an exemplary embodiment for automatically provisioning a device, such as the IPSTB 20, for example, will now be described with reference to FIG. 2. FIG. 2 illustrates a flowchart that represents tasks performed by the IPSTB 20 when being provisioned by IPRM gateway server 10. When the IPSTB 20 is connected to the network and powered on, the IPSTB 20 will perform discovery to locate the IPRM gateway server 10 in the normal manner described above, as defined by the UPnP architecture. During discovery, the IPSTB 20 obtains the IP address of the IPRM gateway server 10 and the device description document that describes the actions and services of the IPRM gateway server 10. This step is represented by block 21. It should be noted that the IP address and device description document of the IPRM gateway server may be obtained through discovery performed by the IPSTB 20, or as a result of the IPRM gateway server 10 broadcasting, or otherwise transmitting, this information over the home network 1.

After the IPSTB 20 obtains the IP address and device description document of the IPRM gateway server 10, it processes the information contained in the device description document and determines based on the information that the gateway server 10 has been located and that it supports the specific IPRM DRM system. This step is represented by block 23. One of the services of the IPRM gateway server 10 is to function as the key distribution center (KDC) of the home network 1, which is referred to herein as the "Mini-KDC". As the Mini-KDC of the home network 1, the IPRM gateway server 10 controls access to content stored on the media servers 11 and 12 of the home network 1, and/or access to other services provided on the home network 1.

In accordance with this exemplary embodiment, the device description document of the IPRM gateway server 10 describes the KDC service as follows:

```
<service>
    <serviceType>urn:schemas-upnp-
org:service:MiniKDC:1</serviceType>
    <serviceId>urn:upnp-org:serviceId:MiniKDC</serviceId>
    <controlURL>/upnp/control/MiniKDC</controlURL>
    <eventSubURL>/upnp/event/MiniKDC</eventSubURL>
    <SCPDURL>/MiniKDCSCPD.xml</SCPDURL>
</service>
```

After the IPSTB 20 has located the IPRM gateway server 10 and processed the information contained in the device description document, it sends a request to the IPRM gateway server 10, as indicated by block 24, to obtain the Service Control Protocol Definition (SCPD) document of the Mini-KDC Service. In response, the IPRM gateway server 10 sends the Mini-KDC SCPD document with pre-provisioning information to the IPSTB 20. The pre-provisioning information is typically contained in an XML SCPD document that resides in the IPRM gateway server 10. In accordance with the exemplary embodiment, the SCPD document describes the pre-provisioning information in the form of provisioning parameters defined as state variable as follows:

```
<?xml version="1.0"?>
    <scpd xmlns="urn:schemas-upnp-org:service-1-0">
        <specVersion>
```

-continued

```
            <major>1</major>
            <minor>0</minor>
        </specVersion>
        <serviceStateTable>
            <stateVariable sendEvents="no">
                <name>DRMVersion</name>
                <dataType>i4</dataType>
            </stateVariable>
            <stateVariable sendEvents="no">
                <name>KDC</name>
                <dataType>boolean</dataType>
            </stateVariable>
            <stateVariable sendEvents="no">
                <name>HMARealm</name>
                <dataType>string</dataType>
            </stateVariable>
            <stateVariable sendEvents="no">
                <name>ExternalRealm</name>
                <dataType>string</dataType>
            </stateVariable>
            <stateVariable sendEvents="no">
                <name>TimeServerName</name>
                <dataType>string</dataType>
            </stateVariable>
        </serviceStateTable>
    </scpd>
```

The pre-provisioning information typically includes a DRM version number, the name of the KDC service of the home gateway server 10, the realm of the home gateway server 10, any external realm if applicable, and a time server name. This information enables the IPSTB 20 to uniquely identify the home gateway server 10.

Although it is preferable that the pre-provisioning information be transmitted by the gateway to the client in an SCPD document, this is not a requirement of the invention. The invention is not limited with respect to the manner or form in which the pre-provisioning information is requested, transmitted or received. For example, the pre-provisioning information may instead be obtained by the client through it sending an action to the gateway. However, this would require that the client register for an event, and that the gateway implement the action in order to return the pre-provisioning information. By defining the information as state variables in an SCPD document, the process of obtaining the pre-provisioning information in the client is simplified.

The IPSTB 20 receives the pre-provisioning information from the IPRM gateway server 10, as indicated by block 26. The IPSTB 20 processes the pre-provisioning information and saves it in memory, as indicated by block 27. The IPSTB 20 then sends its certificate along with the pre-provisioning information and a digital signature to the home gateway server 10, as indicated by block 28. The home gateway server 10 receives the certificate of the IPSTB 20, the pre-provisioning information, and a digital signature, and processes it to authenticate the IPSTB 20. Once the home gateway server 10 has authenticated the IPSTB 20, it sends its Mini-KDC certificate to the IPSTB 20. The IPSTB 20 receives the Mini-KDC certificate, as indicated by block 29, which completes the provisioning process. This associates the IPSTB with the home network and makes it part of the IPRM domain. It should be noted that the specific details of authenticating client and server devices are determined by the particular DRM system in use.

The Mini-KDC certificate contains a public key that is used by the IPSTB 20 to verify the signature of a service ticket reply (AS-REP) message that is sent by the gateway server 10 in response to receiving a service ticket request message (AS-REQ). The service ticket request message requests service tickets for the media servers 11 and 12. The service ticket is later used to obtain a session key that is used to decrypt a downloaded content file. Therefore, once the IPSTB 20 has been provisioned, it is able to access any content files stored on the media servers 11 and 12 and cause the content to be rendered subject to the IPRM license associated with each piece of content.

Figure 3:
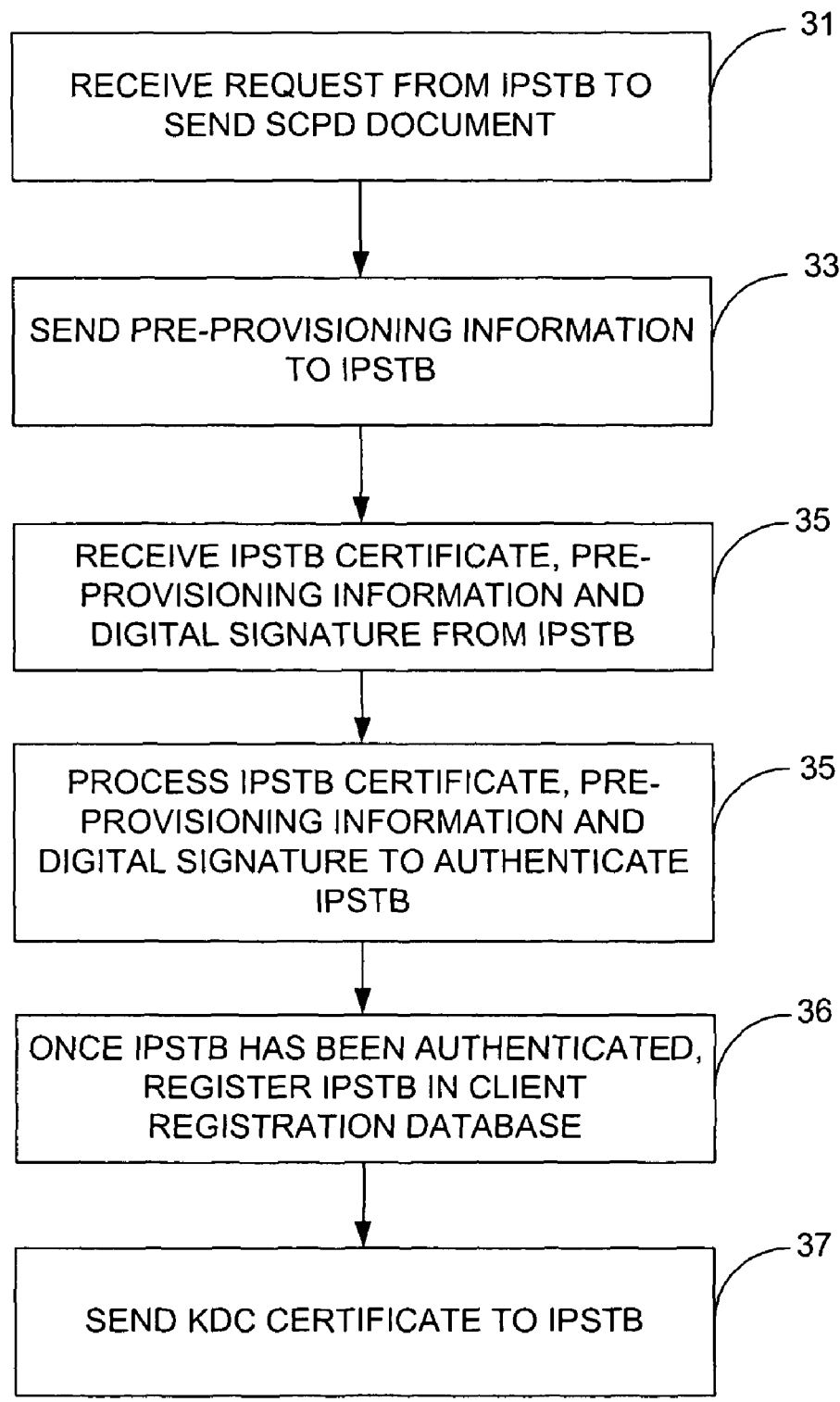
FIG. 3 illustrates a flowchart that represents the method of the invention in accordance with an exemplary embodiment performed by the IPRM gateway server shown in FIG. 1 in provisioning the IPSTB shown in FIG. 1.

The KDC service is provided in the form of a database that contains all of the information needed by the IPSTB 20 to enable it to interact with the IPRM gateway server 10 to provision the IPSTB 20. FIG. 3 illustrates a flowchart that represents the method of the invention in accordance with an exemplary embodiment performed by the IPRM gateway server 10 in provisioning the IPSTB 20. As stated above, after the IPSTB 20 has performed discovery and located the IPRM gateway server 10, the IPSTB 20 sends a request to the IPRM gateway server 10 to obtain the Mini-KDC SCPD document. The IPRM gateway server 10 receives the request from the IPSTB 20, as indicated by block 31. In response to the request, the IPRM gateway server 10 sends the pre-provisioning information to the IPSTB 20, as indicated by block 33. As stated above, the pre-provisioning information will typically be in the form of the XML SCPD document. The IPSTB 20 receives and processes the pre-provisioning information and stores the corresponding pre-provisioning parameters defined as state variables in memory. The IPSTB 20 then sends its own DRM certificate along with the pre-provisioning information and a digital signature to the home gateway server 10.

The home gateway server 10 receives the certificate of the IPSTB 20, the pre-provisioning information and the digital signature, and verifies the signature to authenticate the IPSTB 20, as indicated by block 35. The home gateway server 10 then registers the IPSTB 20 in a client registration database maintained by the home gateway server 10, as indicated by block 36. After authentication has been successfully performed, the home gateway server 10 sends its Mini-KDC certificate to the IPSTB 20, as indicated by block 37.

The Mini-KDC certificate enables the IPSTB 20 to have access to content files stored on the media servers 11 and 12. In particular, the IPSTB 20 uses the Mini-KDC certificate to obtain tickets from the gateway, which it uses to obtain session keys from the media servers to decrypt content files downloaded from the media servers. When the IPSTB 20 initiates a session with one of the media servers, it sends the service ticket in the session key request message (KEY_REQ message), which informs the media server that the IPSTB 20 has DRM authorization from the Mini-KDC. The media server then sends back a session key to the IPSTB 20, which the IPSTB 20 uses during the session with the media server to decrypt content files downloaded from the media server. The process of the IPSTB 20 using the Mini-KDC certificate to obtain tickets from media servers that are used during sessions to obtain access to content files is defined in the IPRM architecture. It should be noted that a similar process is used to stream content instead of downloading entire content files.

Figure 4:
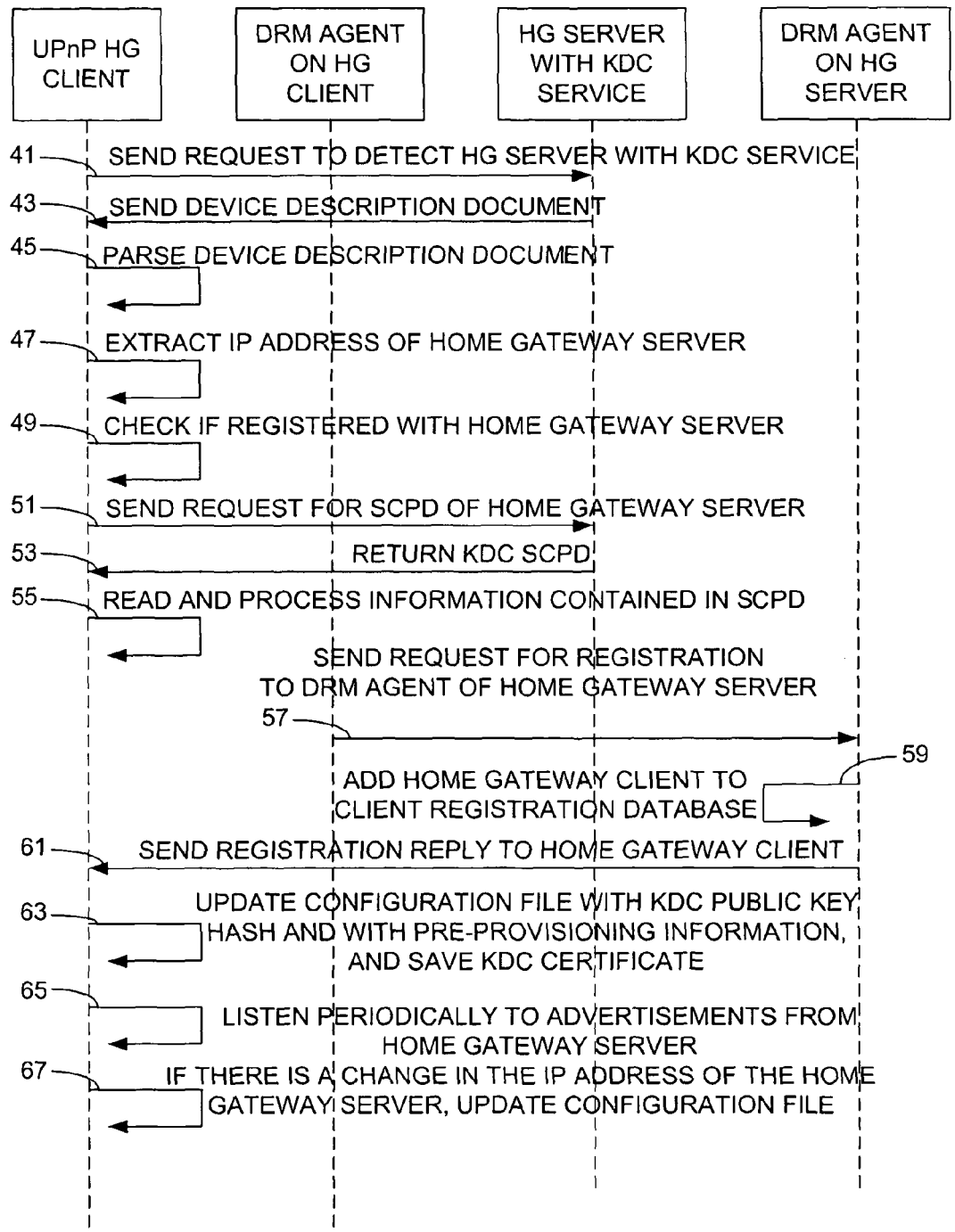
FIG. 4 illustrates a transaction diagram that demonstrates an example of the manner in which provisioning and other tasks may be performed in accordance with the invention using the UPnP messaging command format.

FIG. 4 illustrates a transaction diagram that demonstrates an example of the manner in which provisioning and other tasks may be performed in accordance with the invention using the UPnP messaging command format. A UPnP home gateway client (e.g., the IPSTB 20) sends a request over the home network to detect a home gateway server that has the Mini-KDC service, as indicated by arrow 41. In response, the home gateway server having the Mini-KDC service sends a device advertisement that includes the device description document over the home gateway server, as indicated by arrow 43. Typically, only one server on the home network will have the Mini-KDC service, which is likely selected by the user or determined automatically by the order in which individual devices were added to the home network.

The DRM agent running on the home gateway client parses the device description document of the home gateway server to obtain its IP address, as indicated by arrow 45. The DRM agent then extracts the IP address of the home gateway server from the parsed information, as indicated by arrow 47. The DRM agent of the home gateway client then checks its configuration file to determine whether the home gateway client has already registered with the KDC service of the home gateway server, as indicated by arrow 49. If the home gateway client has previously registered with the KDC service of the home gateway server, then the home gateway client has already been provisioned by the home gateway server.

If the DRM agent running on the home gateway client determines that the home gateway client is not registered with the home gateway server, the home gateway client sends a request for the SCPD document of the home gateway server to the home gateway server, as indicated by arrow 51. In response, the home gateway server sends its Mini-KDC SCPD document to the home gateway client, as indicated by arrow 53. This information is typically obtained by interacting with the DRM agent on the gateway server. The DRM agent of the home gateway client reads the SCPD document to obtain the pre-provisioning information that it needs in order to be provisioned with the home gateway server, as indicated by arrow 55. The home gateway client invokes the DRM agent on the client having the pre-provisioning information. The DRM agent on the client then sends a request to the DRM agent running on the home gateway media server that includes the DRM certificate of the home gateway client and the pre-provisioning information, as indicated by arrow 57. The DRM agent running on the home gateway server then authenticates the home gateway client and adds it to the client registration database, as indicated by arrow 59.

Once the home gateway client has been authenticated and registered with the home gateway server, the DRM agent of the home gateway server sends a registration confirmation reply to the home gateway client that includes the Mini-KDC certificate, as indicated by arrow 61. The home gateway client then updates its configuration file with the KDC public key hash and the pre-provisioning information obtained earlier from the Mini-KDC SCPD document that was saved in the memory, and saves the KDC certificate, as indicated by arrow 63. As described above, the Mini-KDC certificate comprises a public key that the home gateway client uses to obtain service tickets from the home gateway server for the media servers. The home gateway client may occasionally "listen" for discovery advertisements sent over the home network by the home gateway server, as indicated by arrow 65. If the IP address of the home gateway server changes, as sometimes happens, this information will be included in the advertisement. The home gateway client will update its configuration file accordingly. It should be noted that even though one of the primary goals of the invention is to eliminate or minimize user interaction during the provisioning process, some DRM systems may require the user to acknowledge or approve the provisioning of a new device into the home network.

The home gateway client and the home gateway server typically each comprise a processor that executes software programs and a memory device that stores software programs and data. The software programs perform the functions described above with reference to FIGS. 2-4. The processor may be any type of computational device, including, for example, a microprocessor, a microcontroller, an application specific integrated circuit (ASIC), a programmable logic or gate array (e.g., PLAs, FPGAs, etc.). The term "processor" is used herein to denote any of these and other computational devices that can be suitably configured to perform these corresponding functions. Also, a processor as that term is used herein may be a single computational device or a combination of multiple computational devices that are in communication with one another. Also, although the processes described above with reference to FIGS. 2-4 are typically performed in software, they may be performed in hardware or in a combination of hardware and software or firmware.

The software programs described above, such as the DRM agents of the home gateway client and server may be embodied in any type of computer-readable medium such as, for example, random access memory (RAM), dynamic RAM (DRAM), flash memory, read only memory (ROM) compact disk ROM (CD-ROM), digital video disks (DVDs), magnetic disks, magnetic tapes, etc. The invention also encompasses electrical signals modulated on wired and wireless carriers (e.g., electrical conductors, wireless carrier waves, etc.) in packets and in non-packet formats.

The home gateway client to be provisioned may initiate provisioning with the home gateway server upon being connected to the home network. In this case, the client automatically detects the home gateway server with the KDC service, requests pre-provisioning information, receives the pre-provisioning information, and so on, until provisioning has been completed. Alternatively, the home gateway server may initiate provisioning.

It should be noted that the invention has been described with reference to certain preferred and exemplary embodiments and that the invention is not limited to the embodiments described herein. As will be understood by those skilled in the art, in view of the description provided herein, modifications may be made to the embodiments described herein and all such modifications are within the scope of the invention.

What is claimed is:

1. A Universal Plug and Play (UPnP) device that is capable of being automatically provisioned to access digital rights management (DRM) services by a provisioning device through interaction with the provisioning device over a home network, the UPnP device comprising:
    a processor configured to
        obtain pre-provisioning information from said provisioning device, the pre-provisioning information comprising a UPnP device description document indicating availability of a key distribution center service, the device description document further comprising an Internet Protocol (IP) address of said provisioning device,
        send a first certificate associated with said UPnP device along with the obtained pre-provisioning information to said provisioning device to enable said provisioning device to process the first certificate and the pre-provisioning information for authenticating said UPnP device, and
        receive, in response to said UPnP device being authenticated by said provisioning device, a second certificate from said provisioning device to cause said UPnP device to be provisioned; and
    a memory device, the pre-provisioning information being stored in the memory device;
    wherein the UPnP device and the provisioning device are both in the home network and are in communication with one another via the home network.

2. The UPnP device of claim 1, wherein the pre-provisioning information includes a digital rights management (DRM) type and version identifier.

3. The UPnP device of claim 1, wherein the pre-provisioning information includes a name and a realm of the UPnP provisioning device.

4. The UPnP device of claim 1, wherein the pre-provisioning information includes a time server name.

5. The UPnP device of claim 1, wherein the second certificate received by said UPnP device includes a key that is used by the UPnP device to obtain a session key that enables the UPnP device to access content files stored in a media server that is connected and provisioned to the home network.

6. The UPnP device of claim 1, wherein the pre-provisioning information is included in a Service Control Protocol Definition (SCPD) document that is sent by said provisioning device to said UPnP device.

7. The UPnP device of claim 1, wherein the pre-provisioning information is obtained by the processor sending an action to said provisioning device that is implemented by said provisioning device to cause the pre-provisioning information to be returned to said processor.

8. The UPnP device of claim 1, wherein said provisioning device provisions the UPnP device to access one or more digital rights management (DRM) services over the home network.

9. The UPnP device of claim 8, wherein said UPnP device is a set-top box.

10. The UPnP device of claim 8, wherein said UPnP device is a media server.

11. A provisioning device that is capable of provisioning a Universal Plug and Play (UPnP) device to access digital rights management (DRM) services through interaction with said UPnP device over a home network, said provisioning device comprising:
    a processor configured to
        receive a request for pre-provisioning information from said UPnP device and to send pre-provisioning information to said UPnP device, the pre-provisioning information comprising a UPnP device description document indicating availability of a key distribution center service, the device description document further comprising an Internet Protocol (IP) address of said provisioning device,
        receive a first certificate associated with the UPnP device along with the pre-provisioning information from said UPnP device,
        process the received first certificate and the pre-provisioning information to authenticate said UPnP device, and
        send, in response to authenticating said UPnP device, a second certificate to said UPnP device to cause said UPnP device to be provisioned; and
    a memory device, the memory device storing the pre-provisioning information;
    wherein the UPnP device and the provisioning device are both in the home network and are in communication with one another via the home network.

12. The provisioning device of claim 11, wherein said pre-provisioning information includes a digital rights management (DRM) type and version identifier.

13. The provisioning device of claim 11, wherein said pre-provisioning information includes a name and a realm of said UPnP provisioning device.

14. The provisioning device of claim 11, wherein the pre-provisioning information includes a time server name.

15. The provisioning device of claim 11, wherein the second certificate sent to said UPnP device includes a key that is used by the UPnP device to obtain a session key that enables the UPnP device to access content files stored in a media server that is connected and provisioned to the home network.

16. The provisioning device of claim 11, wherein the pre-provisioning information is included in a Service Control Protocol Definition (SCPD) document that is sent by said provisioning device to said UPnP device.

17. The provisioning device of claim 11, wherein said provisioning device provisions said UPnP device to access one or more digital rights management (DRM) services over the home network.

18. The provisioning device of claim 17, wherein said provisioning device is a set-top box.

19. The provisioning device of claim 17, wherein said provisioning device is a video recorder.

20. The provisioning device of claim 17, wherein said provisioning device is a personal computer.

21. A method for provisioning a Universal Plug and Play (UPnP) device with a provisioning device over a home network to access digital rights management (DRM) services, the method comprising:
  sending a request from a UPnP device to a provisioning device for pre-provisioning information;
  receiving pre-provisioning information in said UPnP device sent by said provisioning device to said UPnP device, the pre-provisioning information comprising a UPnP device description document indicating availability of a key distribution center service, the device description document further comprising an Internet Protocol (IP) address of said provisioning device;
  sending a first certificate associated with the UPnP device along with the obtained pre-provisioning information from said UPnP device to said provisioning device to enable said provisioning device to process the first certificate and the pre-provisioning information for authenticating said UPnP device, and
  receiving, in response to the UPnP device being authenticated by the provisioning device, a second certificate in said UPnP from said provisioning device to cause said UPnP device to be provisioned by said provisioning device;
  wherein the UPnP device and the provisioning device are both in the home network and are in communication with one another via the home network.

22. The method of claim 21, wherein the pre-provisioning information includes a digital rights management (DRM) type and version identifier.

23. The method of claim 21, wherein the pre-provisioning information includes a name and a realm of the UPnP provisioning device.

24. The method of claim 21, wherein the pre-provisioning information includes a time server name.

25. The method of claim 21, wherein the pre-provisioning information is included in a Service Control Protocol Definition (SCPD) document that is sent by said provisioning device to said UPnP device.

26. A method for provisioning a Universal Plug and Play (UPnP) device with a provisioning device over a home network to access digital rights management (DRM) services, the method comprising:
  receiving a request for pre-provisioning information in a provisioning device, the request being sent by a UPnP device;
  sending pre-provisioning information to said UPnP device from said provisioning device, the pre-provisioning information comprising a UPnP device description document indicating availability of a key distribution center service, the device description document further comprising an Internet Protocol (IP) address of said provisioning device;
  receiving a first certificate associated with said UPnP device along with the pre-provisioning information from said provisioning device
  processing the received first certificate and the pre-provisioning information to authenticate said UPnP device, and
  sending, in response to authenticating said UPnP device, a second certificate to said UPnP device to cause said UPnP device to be provisioned;
  wherein the UPnP device and the provisioning device are both in the home network and are in communication with one another via the home network.

27. The method of claim 26, wherein the pre-provisioning information includes a digital rights management (DRM) type and version identifier.

28. The method of claim 26, wherein the pre-provisioning information includes a name and a realm of the UPnP provisioning device.

29. The method of claim 26, wherein the pre-provisioning information is included in a Service Control Protocol Definition (SCPD) document that is sent by said provisioning device to said UPnP device.

30. A computer program for provisioning a Universal Plug and Play (UPnP) device with a provisioning device over a home network to access digital rights management (DRM) services, the program being embodied on a non-transitory computer-readable medium, the program comprising:
  instructions for sending a request from a UPnP device to a provisioning device for pre-provisioning information;
  instructions for receiving pre-provisioning information in said UPnP device sent by said provisioning device to said UPnP device, the pre-provisioning information comprising a UPnP device description document indicating availability of a key distribution center service, the device description document further comprising an Internet Protocol (IP) address of said provisioning device; and
  instructions for processing the received pre-provisioning information in said UPnP device to cause said UPnP device to be provisioned by said provisioning device;
  instructions for sending a first certificate associated with the UPnP device along with the obtained pre-provisioning information from said UPnP device to said provisioning device to enable said provisioning device to process the first certificate and the pre-provisioning information for authenticating said UPnP device; and
  instructions for receiving, in response to the UPnP device being authenticated by the provisioning device, a second certificate in said UPnP from said provisioning device to cause said UPnP device to be provisioned by said provisioning device;
  wherein the UPnP device and the provisioning device are both in the home network and are in communication with one another via the home network.

31. A computer program for provisioning a Universal Plug and Play (UPnP) device with a provisioning device over a home network to access digital rights management (DRM) services, the program being embodied on a non-transitory computer-readable medium, the program comprising:
  instructions for receiving a request for pre-provisioning information in a provisioning device, the request being sent by a UPnP device;
  instructions for sending pre-provisioning information to said UPnP device from said provisioning device, the pre-provisioning information comprising a UPnP device description document indicating availability of a key distribution center service, the device description document further comprising an Internet Protocol (IP) address of said provisioning device;

instructions for receiving a first certificate associated with the UPnP device along with the pre-provisioning information from said UPnP device;

instructions for processing the received first certificate and the pre-provisioning information to authenticate said UPnP device; and instructions for sending, in response to authenticating said UPnP device, a second certificate to said UPnP device to cause said UPnP device to be provisioned;

wherein the UPnP device and the provisioning device are both in the home network and are in communication with one another via the home network.

* * * * *